Jan. 31, 1967 D. E. THOMAS 3,302,100

CONTINUOUSLY VARIABLE PHASE SHIFTER USING A PASSIVE NETWORK TERMINATED IN AN ACTIVE IMPEDANCE TRANSFORMING DEVICE

Filed July 6, 1964

INVENTOR
D. E. THOMAS
BY L. R. Rahn Jr.
ATTORNEY

United States Patent Office 3,302,100
Patented Jan. 31, 1967

3,302,100
CONTINUOUSLY VARIABLE PHASE SHIFTER USING A PASSIVE NETWORK TERMINATED IN AN ACTIVE IMPEDANCE TRANSFORMING DEVICE

Donald E. Thomas, Madison, N.J., assignor to Bell Telephone Laboratories, Incorporated, New York, N.Y., a corporation of New York Filed July 6, 1964, Ser. No. 380,558
8 Claims. (Cl. 323—125)

Figure 1:
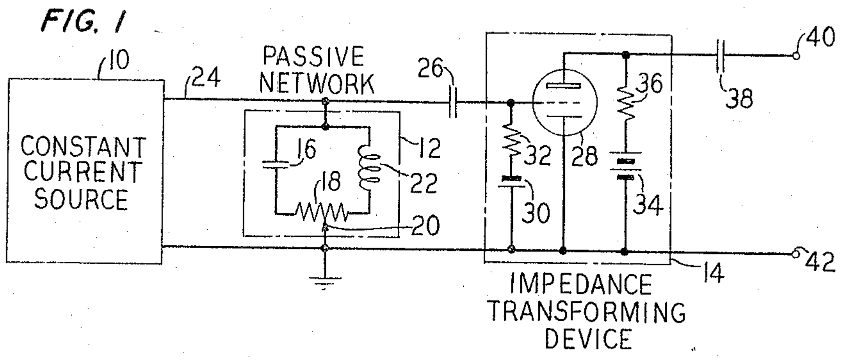

This invention relates to variable phase shifters capable of introducing phase shifts in an alternating current waveform over discrete and continuous ranges.

Variable phase shifters of alternating current waveforms find use in the laboratory and in the field for testing and adjusting electronic equipment. One important application of variable phase shifters, for example, is in a phase synchronization system for an oscillator such as shown in U.S. Patent 3,010,073, issued November 21, 1961, to C. M. Melas. In a phase synchronization system, a variable phase shifter is used to make an initial adjustment of the phase shift in the control loop and later adjustments to compensate for phase drift arising in the loop.

Characteristics that are generally looked for in variable phase shifters are the ability to introduce phase shifts over a full 360-degree range, constancy in the amplitude of the phase shifted signal over the full range, and linearity of the phase shifts introduced by the phase shifter as a function of the adjustment made. Unfortunately, available phase shifters rating high in these characteristics are expensive and electrically complex.

It is well known that passive networks comprising inductors, capacitors, and resistors are capable of producing phase shifts simply and at modest cost. One such passive network is constructed of a capacitor, an inductor, and a potentiometer each connected to the other two. The phase shift, having a range approaching 180 degrees, is introduced between the movable contact of the potentiometer and the capacitor-inductor junction. The remaining 180 degrees to provide a full 360-degree range can be obtained by reversal of the signal polarity. In phase shifters employing the described passive network, as well as the other types of passive phase shifting networks, the output across which the phase shifted signal appears restricts the range of phase shifts that the passive network is capable of introducing, if the output, due to its impedance, loads the passive network. (In the sense used throughout this specification, a component or device loads a circuit in which it is connected, if it has an appreciable effect on the currents and voltages in the circuit, or conversely a component is prevented from loading a circuit in which it is connected, if it has a negligible effect on the currents and voltages in the circuit.) Moreover, the described passive network also exhibits poor amplitude constancy and linearity when the circuit is loaded.

It is therefore the object of this invention to improve the range, amplitude constancy, linearity, and simplicity of design of a variable phase shifter of the type employing a passive network to introduce a phase shift in an alternating current waveform.

According to the invention, an alternating current source of electrical power having one constant terminal characteristic, a two-terminal passive network capable of introducing a full range of phase shifts, and an impedance transforming device are connected in the relationship that causes the variations of the other terminal characteristic of the source to be impressed upon the input of the impedance transforming device. The input impedance of the impedance transforming device is such that the device is prevented from loading the circuit. Stated in other terms, with respect to the impedance of the passive network the input impedance of the impedance transforming device is of boundary value, i.e., essentially an open circuit or a short circuit depending upon the relationship in which the source, passive network, and device are connected. Consequently, the phase shifted signal appears across the output of the impedance transforming device, the input impedance of which does not limit or effect the range of the phase shifts that the passive network is capable of introducing. Due in part to use of a source having one constant terminal characteristic, the amplitude constancy of the phase shifted signal is also improved.

In one embodiment, an alternating current source having a constant terminal current characteristic, i.e., a constant current source, a two-terminal passive network, and an impedance transforming device whose input is essentially an open circuit are connected in parallel relationship. The passive network comprises a capacitor, an inductor, and a potentiometer each connected to the other two, with the potentiometer slider arm and the junction between the capacitor and the inductor forming the terminals of the passive network. Adjustment of the phase shifter is accomplished by changing the position of the potentiometer slider arm and consequently changing the phase of the voltage between the terminals of the passive network.

In another embodiment, which is the circuit dual of the embodiment described in the preceding paragraph, an alternating current source having a constant terminal voltage characteristic, i.e., a constant voltage source, a passive network identical to that described in the preceding paragraph, and an impedance transforming device whose input is essentially a short circuit are connected in series. As the phase shifter is adjusted in this arrangement, the phase of the current passing through the passive network changes.

There are three alternative passive networks that improve the characteristics of the phase shifter described in the preceding paragraph. One of these alternatives adds to the described passive network a second potentiometer connected in parallel with the original potentiometer. The slider arm of the second potentiometer is connected to ground and ganged to move in opposition to the slider arm of the original potentiometer. This arrangement improves the range, amplitude constancy, and linearity of the phase shifter. The second alternative passive network, useful when the source deviates substantially from a constant voltage characteristic, adds to the first alternative the series combination of a variable resistor and a fixed resistor in shunt with the source. The variable resistor is a potentiometer with its end terminals connected together. Its slider arm is connected to ground and is ganged to the other slider arms. The third alternative passive network, also useful when the source deviates substantially from a constant voltage characteristic, introduces phase shifts over a discrete range, viz., plus 90–0–minus 90 degrees. A capacitor, an inductor, or a resistor is switched between the source and the impedance transforming device on an alternative basis, while the other two are connected to ground, so as to introduce either a plus 90-degree phase shift, a 0-degree phase shift, or a minus 90-degree phase shift, respectively.

Another passive network, which can be employed in either embodiment of the phase shifter, also introduces phase shifts over a discrete range consisting of plus 90–0–minus 90 degrees. A capacitor, an inductor, or a resistor is switched between the source and the impedance transforming device on an alternative basis, while the other two are not connected in any closed circuit.

Figure 2:
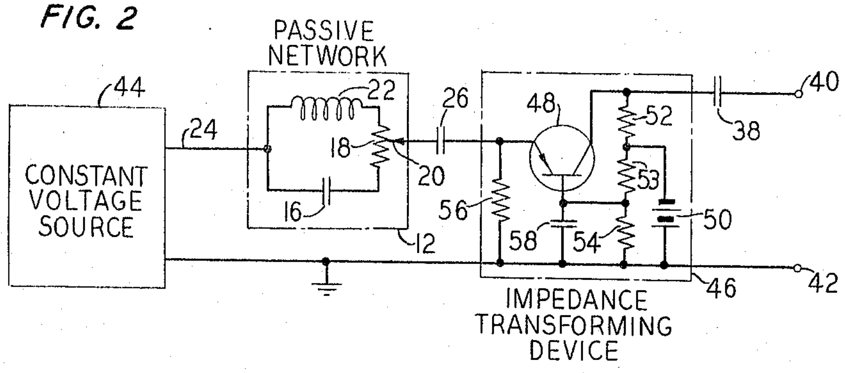
Figure 3:
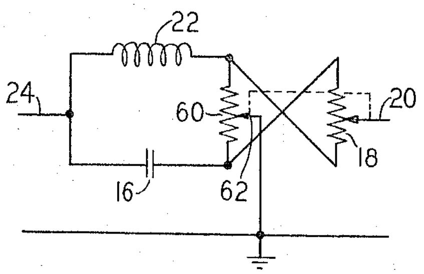
Figure 4:
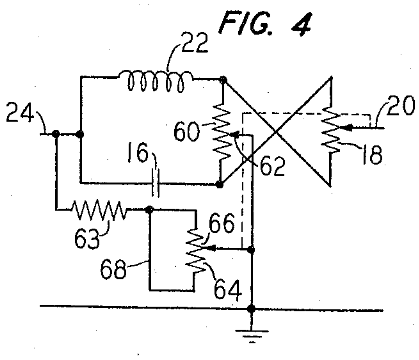
Figure 5:
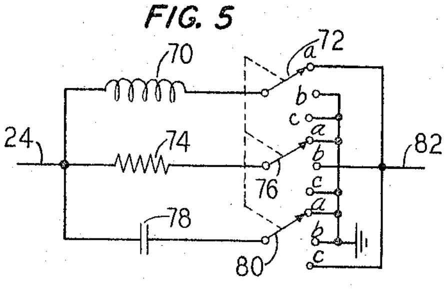
Figure 6:
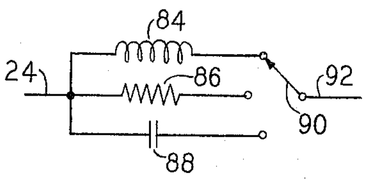

The above and other features of the invention will be considered further in the following detailed description taken in conjunction with the drawings in which:

FIGS. 1 and 2 are circuit diagrams of dual embodiments of a phase shifter constructed in accordance with the principles of the invention;

FIGS. 3, 4, and 5 are circuit diagrams of alternatives to the passive network disclosed in FIG. 2; and FIG. 6 is a circuit diagram of an alternative to the passive network disclosed in either FIG. 1 or FIG. 2.

In FIG. 1 an alternating current source 10 having constant current source output characteristics and whose output is to be shifted in phase, a passive network 12, and an impedance transforming device 14 having an open-circuit input characteristic are shown connected in parallel. Source 10 produces a terminal current that is essentially constant in amplitude and phase and therefore not a function of the external impedance connected across its terminals. Stated another way, source 10 has an internal impedance that is essentially infinite with respect to the external impedance connected across its terminals. Source 10 can have many forms, as for example, a pentode vacuum tube biased for class A operation. In this case, the signal to be shifted in phase is applied to the control grid of the pentode, and its plate circiut, which has a very high impedance, serves as the output of source 10. Passive network 12 comprises a potentiometer 18 having a slider arm 20 and a capacitor 16 and an inductor 22 having equal reactances, each connected to the other two. A lead 24 and a D.-C. blocking capacitor 26 couple constant current source 10 to impedance transforming device 14. Slider arm 20 is connected to ground.

The phase shifter is adjusted by changing the position of slider arm 20. When slider arm 20 is located at the left stop of potentiometer 18, the voltage between lead 24 and ground is for the most part determined by the reactance of capacitor 16, because it is smaller than the impedance of the branch connected in parallel with capacitor 16, viz., the impedance of the series combination of potentiometer 18 and inductor 22. Thus the phase shift of the voltage across passive network 12 approaches minus 90 degrees with respect to the current emanating from source 10. Similarly, when slider arm 20 is located at the right stop of potentiometer 18, the voltage between lead 24 and ground is for the most part determined by the reactance of inductor 22, because it is much smaller than the impedance of the branch connected in parallel with inductor 22, viz., the impedance of the series combination of potentiometer 18 and capacitor 16. Thus the phase shift of the voltage across passive network 12 approaches plus 90 degrees with respect to the current emanating from source 10. For positions of slider arm 20 intermediate to the stops passive network 12 introduces corresponding phase shifts in a continuous range lying between plus 90 degrees and minus 90 degrees. At the midpoint of potentiometer 18 the impedances of the two parallel branches between slider arm 20 and ground are the complex conjugates of one another. As a result the effect of inductor 22 to produce a phase leading voltage is balanced by the effect of capacitor 16 to produce a phase lagging voltage, so the voltage across passive network 12 is in phase with the current emanating from source 10.

Impedance transforming device 14 comprises a triode vacuum tube 28 connected in the grounded-cathode configuration and biased for class A operation by a battery 34, a resistor 36, a battery 30, and a grid leak resistor 32 having a very high resistance so as not to load the circuit. As is well known, the input impedance of a triode arranged as shown in FIG. 1 is very large. Thus, with respect to the impedance of passive network 12 the input impedance of triode 28 has negligible effect on the voltage between the junction of inductor 22 and capacitor 16 and ground. That is to say, the input of triode 28 closely approximates an open circuit. A D.-C. blocking capacitor 38 couples the plate of triode 28 to output terminals 40 and 42 across which the phase shifted signal developed by passive network 12 appears.

FIG. 2 shows a circuit dual of the arrangement disclosed in FIG. 1. An alternating current source 44 having constant voltage output characteristics and whose output is to be shifted in phase, passive network 12, and an impedance transforming device 46 having a short-circuit input characteristic are connected in series. Source 44 produces a terminal voltage that is essentially constant in amplitude and phase and therefore not a function of the external impedance connected across its terminals. Stated another way, source 44 has an internal impedance that is essentially zero compared to the external impedance connected across its terminals. Source 10 can have many forms, as for example an emitter-follower transistor amplifier biased for class A operation. The alternating current signal to be shifted in phase, in this case, is applied to the base of the transistor, and its emitter circuit, which has a very low impedance, serves as the output of source 44. As in the phase shifter of FIG. 1, lead 24 connects the source to passive network 12, D.-C. blocking capacitor 26 couples passive network 12 to the impedance transforming device, and D.-C. blocking capacitor 38 couples the impedance transforming device to output terminals 40 and 42. Adjustment of the phase shifter of FIG. 2 gives rise to changes in the current passing through passive network 12, analogous to the changes in voltage across the passive network of FIG. 1, thus causing corresponding changes in the phase of the signal appearing between terminals 40 and 42. Positioning slider arm 20 at the lower stop of potentiometer 18 produces a phase shift of the current passing through passive network 12 that approaches plus 90 degrees with respect to the voltage across source 44 and positioning slider arm 20 at the upper stop of potentiometer 18 produces a phase shift of the current passing through passive network 12 that approaches minus 90 degrees with respect to the voltage produced by source 44.

Impedance transforming device 46 comprises a transistor 48 connected in the common-base configuration and biased for class A operation by a battery 50, a resistor 52, a resistor 53, a resistor 54, and a resistor 56. An A.-C. bypass capacitor 58 couples the base of transistor 48 directly to ground. As is well known, the input impedance of a common-base transistor amplifier is very small when operating with emitter current of several milliamperes or more. Thus, with respect to the impedance of passive network 12, the input impedance of transistor 48 is insignificant and has negligible effect on the current passing through passive network 12. That is to say, the input of transistor 48 closely approximates a short circuit.

Although the impedance transforming devices disclosed in FIGS. 1 and 2 have the advantage of being relatively simple and inexpensive and are for that reason preferred, there are other types of impedance transforming devices that can be constructed to provide the proper input characteristics for practice of the invention. For example, an operational amplifier or a transformer connected in tandem with an amplifier can be used.

If the output circuit across which the phase shifted signal appears were connected directly to the passive network, instead of being isolated from it by a nonloading impedance transforming device, as shown in FIGS. 1 and 2, the output circuit would load the passive network and its impedance would affect the phase and amplitude of the phase shifted signal. The most detrimental effect on the phase of the signal is to reduce the range of the phase shifter, and the most detrimental effect on the amplitude of the signal is to increase its variation over the range of the phase shifter. Moreover, the internal impedance of the source of signals to be phase shifted may further increase the variation in the amplitude of the phase shifted signal over its range. According to the technique of the invention this increase in amplitude variation is eliminated by using a source having an internal impedance of boundary value, i.e., a constant current source or a constant voltage source, in combination with the nonloading impedance transforming device.

In regard to both the phase shifter disclosed in FIG. 1 and the phase shifter disclosed in FIG. 2, it should be noted that the relationship in which the source of signals to be shifted in phase, the passive network, and the impedance transforming device are connected, i.e., parallel relationship in the case of the elements used in FIG. 1 and series relationship in the case of the elements used in FIG. 2, and that the correspondence of the input impedance of the impedance transforming device to the particular characteristics of the source, i.e., open-circuit input corresponding to constant current source and short-circuit input corresponding to constant voltage source, are critical. Satisfaction of these conditions prevents the impedance transforming device from loading the circuit and causes variations in the nonconstant terminal characteristic to be impressed upon the input of the impedance transforming device. For example, if a constant current source, a passive network, and an impedance transforming device having open-circuit input characteristics were connected in series relationship or a constant current source, a passive network, and an impedance transforming device having short-circuit input characteristics were connected in parallel relationship, the impedance transforming device would load the circuit. Further, if a constant current source, a passive network, and an impedance transforming device having short-circuit input characteristics were connected in series relationship, although the impedance transforming device would be prevented from loading the circuit, variations in voltage produced by adjusting the resulting phase shifter would not be impressed upon the input of the impedance transforming device. All three of these arrangements, as well as their duals involving a constant voltage source, are virtually inoperative as phase shifters.

According to another aspect of the invention, novel passive networks having phase shifting characteristics superior to passive network 12 are provided. In order to illustrate the shortcomings of the characteristics of passive network 12 consider the following. The larger the resistance of potentiometer 18, the closer the range of passive network 12 approaches a full 180 degrees. This can be understood by considering that when slider arm 20 is at one stop of potentiometer 18 in FIG. 2, a large potentiometer resistance causes the effect of the reactive element connected to the opposite stop of potentiometer 18 upon the total impedance of passive network 12 to be small and the phase shift introduced by phase network 12 is mostly dependent upon the reactance of the reactive element directly connected to slider arm 20. On the other hand, the larger the resistance of potentiometer 18, the greater is the variation in the amplitude of the current passing through passive network 12 and thus the greater is the variation of the amplitude of the phase shifted signal appearing across output terminals 40 and 42. To achieve the best possible constancy in the amplitude of the current passing through passive network 12, the resistance of potentiometer 18 ought to be equal to the sum of the magnitude of the reactance of capacitor 16 and inductor 22. Under these conditions, the magnitude of the impedance of passive network 12 is the same when slider arm 20 is at one stop, at the other stop, or at the midpoint of potentiometer 18 and varies only slightly in between these three points. However, the range of the phase shifter is then greatly restricted, being about 90 degrees.

FIG. 3 shows a passive network that is an alternative to that shown in FIG. 2 and that avoids the necessity for the compromise in the selection of the resistance of potentiometer 18 required in the arrangement of FIG. 2. The passive network of FIG. 3 adds to the passive network of FIG. 2 a second potentiometer 60 connected in parallel with potentiometer 18 and having a slider arm 62 that is ganged to move opposite to slider arm 20. The resistance of potentiometer 18 in FIG. 3 is preferably equal to the sum of the magnitudes of the reactance of capacitor 16 and inductor 22, which are in turn equal, and the resistance of potentiometer 60 is much larger than the resistance of potentiometer 18. When slider arms 20 and 62 are at the upper stops of potentiometers 18 and 60, respectively, capacitor 16 is coupled directly to the input of impedance transforming device 46 by slider arm 20 and inductor 22 is connected directly to ground by slider arm 62. In this slider arm position, the current passing through inductor 22 is shunted to ground while the current passing through capacitor 16 is impressed upon the input of impedance transforming device 46. Thus the reactance of inductor 22 has negligible effect on the phase of the current impressed upon impedance transforming device 46. Likewise, when slider arms 20 and 62 are at the lower stops of potentiometers 18 and 60, respectively, inductor 22 is coupled directly to impedance transforming device 46 by slider arm 20 and capacitor 16 is shunted directly to ground by slider arm 62. Thus, in this position the reactance of capacitor 16 has negligible effect on the phase of the current impressed upon impedance transforming device 46. As a result, the passive network of FIG. 3 is capable of introducing a range of phase shifts closely approaching a full 180 degrees. At the same time, good amplitude constancy of the phase shifted signal is maintained. When slider arm 20 is at one of the stops on potentiometer 18 the current impressed upon impedance transforming device 46 is determined by the magnitude of the reactance of the reactive element connected directly to slider arm 20. When slider arm 20 is at the midpoint of potentiometer 18 the current impressed upon impedance transforming device 14 is determined by the magnitude of the impedance of the series combination of inductor 22 and one-half of potentiometer 18 connected in parallel with the series combination of capacitor 16 and the other half of potentiometer 18. The magnitude of this impedance, the magnitude of the reactance of capacitor 16, and the magnitude of the reactance of inductor 22 are all equal. Accordingly, the magnitude of the current impressed upon impedance transforming device 46 is the same for all three positions. A wide range of values of resistance for potentiometer 60 is permissible. The smaller values yield better range and linearity, and the larger values yield better amplitude constancy. So a compromise must be struck in choosing the resistance of potentiometer 60, depending upon which characteristic is more important—range, linearity, or amplitude constancy. If the resistance of potentiometer 60 is approximately 10 times that of potentiometer 18 a good balance in the characteristics occurs. The variation in the amplitude of the phase shifted signal is less than 10% and the maximum deviation from linearity is 9 degrees over the entire range of the passive network.

In practice, if constant voltage source 44 deviates from its constant voltage characteristic, i.e., it has an internal impedance which is substantial relative to the impedance of the passive network of FIG. 3, this phase shifter does not possess the excellent amplitude constancy referred to in the preceding paragraph. The internal impedance of the source and the passive network can be considered to be a voltage divider circuit. Assume that when slider arm 20 is at the midpoint of potentiometer 18, the internal impedance of source 44 and the impedance of passive network 12 are equal. Therefore one-half of the open circuit voltage of the source appears across its output terminals. When movable contact 20 is at one of the stops both inductor 22 and capacitor 16 are in essence connected to ground and, as viewed from the terminals of the source, constitute a parallel resonant circuit. The parallel resonant circuit has a much higher impedance than the internal impedance of the source and therefore almost the entire open circuit voltage of the source appears across its output terminals. This represents an increase of about 100% in the amplitude of the phase shifted signal.

FIG. 4 shows an alternative to the passive network of FIG. 2 employed to overcome the shortcomings of the passive network of FIG. 3 when encountering a source that deviates from a constant voltage characteristic. A resistor 63 and a potentiometer 64 that provides a variable resistance are added to the ararngement of FIG. 3 in shunt across the terminals of the source. The end terminals of potentiometer 64 are connected together by a lead 68 and a slider arm 66 of potentiometer 64 is connected to ground. Resistor 63 is connected between the ungrounded terminal of the source and the end terminals of potentiometer 64. Slider arm 66 is ganged to slider arms 62 and 20. As the slider arms are moved away from the stop positions toward the midpoints of their respective potentiometers, the resistance of resistor 63 and potentiometer 64 connected in shunt with the source increases and the current applied to impedance transforming device 46 increases. This increase in current offsets the decrease in current caused by the internal impedance of source 44. Although the resistance of resistor 63 and potentiometer 64 are not critical, a resistance for resistor 63 of .35 times the resistance of potentiometer 18, and a resistance for potentiometer 66 of 10 times the resistance of potentiometer 18 (the resistance of potentiometers 18 and 60 being the same value as in FIG. 3) achieves good results when the internal impedance of source 44 is resistive and equals the magnitude of the reactance of one of the reactive elements. Under these conditions, variations in amplitude of the phase shifted signal are held to within 7% and deviations of the phase from linearity are less than 6 degrees.

FIG. 5 discloses a passive network that gives rise to a phase shifter having a discrete range when substituted for the passive network of FIG. 2. An inductor 70 is connected to a switch 72, a resistor 74 is connected to a switch 76, and a capacitor 78 is connected to a switch 80. The switches, which are ganged together, each have three positions, *a*, *b*, and *c*. In each position, a different one of elements 70, 74, and 78 is connected to a lead 82 corresponding to movable contact 20 in FIG. 2, and the other two elements are connected to ground. The magnitude of the reactance of inductor 70, the reactance of capacitor 78, the resistance of resistor 74 are all equal. This arrangement introduces a phase shift of plus 90 degrees, 0 degree, or minus 90 degrees and maintains the amplitude of the phase shifted signal constant. A source deviating from a constant voltage characteristic still results in good amplitude constancy with this passive network, because the impedance connected between the output terminals of the source is constant (equal to the impedance of inductor 70, capacitor 78, and resistor 74 connected in parallel) regardless of the positions of switches 72, 74, and 76.

FIG. 6 shows another passive network that results in a discrete phase shifter capable of introducing phase shifts of plus 90 degrees, 0 degree, or minus 90 degrees. It can be substituted for the passive network in either FIG. 1 or FIG. 2. An inductor 84, a resistor 86, and a capacitor 88 are connected on an alternative basis by a switch 90 between lead 24 and a lead 92, corresponding to movable contact 20 in FIGS. 1 and 2. Although only one switch is necessary, unlike the passive network of FIG. 5, it requires a source with a constant terminal characteristic to have good amplitude constancy.

The passive networks shown in FIGS. 1, 2, and 6 are bilateral in the sense that their terminal connections can be reversed without impairing operation of the phase shifter. On the other hand, the passive networks in FIGS. 3, 4, and 5 are not bilateral. Reversal of their terminal connections short circuits the source of signals to be phase shifted.

What is claimed is:

1. A variable phase shifter which comprises a source of alternating current, said source having a pair of output terminals and an output terminal characteristic which is substantially constant and independent of the magnitude of any external impedance connected between said output terminals, a passive phase shifting network, and an impedance transforming device, said phase shifting network being connected between the output terminals of said source and said impedance transforming device, said impedance transforming device having an input impedance and said phase shifting network having an output impedance, the magnitude of said input impedance being at least several orders of magnitude different from the magnitude of said output impedance, thereby substantially eliminating any loading effect of said impedance transforming device on the output of said phase shifting network and extending the effective phase shifting range of said network.

2. A variable phase shifter in accordance with claim 1 in which said alternating current source has an internal impedance that is many times larger than the externally connected impedance between its output terminals, and in which the input impedance of said impedance transforming device is many times greater than the output impedance of said phase shifting network, whereby the input impedance of said impedance transforming device presents substantially an open circuit to the output impedance of said phase shifting network, one terminal each of said source, said network, and said impedance transforming device being connected to one common junction point, and another terminal each of said source, said network, and said impedance transforming device being connected to another common junction point, whereby said source, said network, and said impedance transforming device are connected in parallel.

3. A variable phase shifter in accordance with claim 1 in which said phase shifting network comprises a pair of terminals, a potentiometer having a resistance arm and a movable contact on said arm, a capacitor, and an inductor, said capacitor and said inductor each having one terminal connected to one terminal of said network and each having its other terminal connected to one of the ends of the resistance arm of said potentiometer, and said potentiometer having its movable contact connected to another one of said terminals of said network, whereby a change in position of said movable contact produces variation in phase of the output waveform of said alternating current source.

4. A variable phase shifter in accordance with claim 1 in which said phase shifting network comprises a capacitor, an inductor, and a resistor as phase shifting impedances, and a switch having a contact arm and three terminals, one terminal of ench of said capacitor, said inductor, and said resistor being connected in common to one terminal of said phase shifting network, the remaining terminal of each of said capacitor, said inductor, and said resistor being connected to one of said switch terminals, said contact arm of said switch being connected to another terminal of said phase shifting network, whereby the position of said switch contact arm on a respective one of said switch terminals determines which of said phase shifting impedances is connected between the terminals of said network to determine the phase shift of said variable phase shifter.

5. A variable phase shifter in accordance with claim 1 in which said phase shifting network comprises a capacitive impedance, an inductive impedance, a resistive impedance, and means for switching any one of said elements in a closed series circuit with said source and said impedance transforming device and for switching the other two respective remaining impedances in parallel with said source.

6. A variable phase shifter in accordance with claim 1 in which said alternating current source has an internal impedance that is substantially infinitesimal with respect to the externally connected impedance between its output terminals, and in which the input impedance of said impedance transforming device is many times smaller than the output impedance of said phase shifting network, whereby the input impedance of said impedance transforming device presents substantially a short circuit to the output impedance of said network, one output terminal of said source being connected to one terminal of said network, another terminal of said network being connected to one terminal of said impedance transforming device, and another terminal of said impedance transforming device being connected to another output terminal of said source, whereby said source, said network, and said impedance transforming device are connected in series.

7. A variable phase shifter in accordance with claim 6 in which said phase shifting network comprises a capacitor, an inductor, a first and a second potentiometer each having a resistance arm and a movable contact on a respective resistance arm, means connecting said inductor, said capacitor, and the resistance arm of said first potentiometer each to the other two, means connecting the resistance arm of said second potentiometer in parallel with the resistance arm of said first potentiometer, and means ganging said movable contacts for opposite movement, means connecting the junction of said inductor and said capacitor to one terminal of said phase shifting network, means connecting the movable contact of said first potentiometer to another terminal of said phase shifting network, and means connecting the movable contact of said second potentiometer to the junction point of said other terminals of said source and said impedance transforming device.

8. A variable phase shifter in accordance with claim 6 in which said phase shifting network comprises a capacitor, an inductor, a resistor, a first potentiometer, a second potentiometer, and a third potentiometer, each of said potentiometers having a resistance arm and a movable contact on a respective resistance arm, said resistor, said inductor, and said capacitor each having one of its terminals connected to one terminal of said phase shifting network, said third potentiometer having the ends of its resistance arm connected together and connected to another terminal of said resistor, said capacitor and said inductor each having another of its terminals connected to one end of the resistance arm of said first potentiometer, means connecting the resistance arm of said second potentiometer in parallel with the resistance arm of said first potentiometer, and means ganging the respective movable contacts of said first, second, and third potentiometers for simultaneous movement such that the movement of said movable contact of said second potentiometer is opposite the movement of said movable contact of said first potentiometer, means connecting the movable contact of said second potentiometer to the other terminal of said phase shifting network, and means connecting the movable contacts of said first and third potentiometers to the junction point of said other terminals of said alternating current source and said impedance transforming device.

References Cited by the Examiner

UNITED STATES PATENTS

| | | | |
|---|---|---|---|
| 1,717,400 | 6/1929 | Nyquist | 323—123 |
| 1,923,252 | 8/1933 | Brolly | 323—125 |
| 2,079,488 | 5/1937 | Champlin | 323—125 X |
| 2,229,450 | 1/1941 | Garman | 323—125 X |
| 2,411,423 | 11/1946 | Guptill | 323—126 X |
| 2,794,948 | 6/1957 | Thompson et al. | 323—122 |

JOHN F. COUCH, *Primary Examiner.*

A. D. PELLINEN, *Assistant Examiner.*